(12) United States Patent
Ghoraishi et al.

(10) Patent No.: US 11,510,161 B2
(45) Date of Patent: Nov. 22, 2022

(54) WIRELESS COMMUNICATION SYSTEM AND METHOD

(71) Applicant: pureLiFi Limited, Edinburgh (GB)

(72) Inventors: Mir Mohammadhossein Ghoraishi, Edinburgh (GB); Stephan Berner, Edinburgh (GB)

(73) Assignee: pureLiFi Limited, Edinburgh (GB)

( * ) Notice: Subject to any disclaimer, the term of this patent is extended or adjusted under 35 U.S.C. 154(b) by 0 days.

(21) Appl. No.: 17/272,784

(22) PCT Filed: Aug. 30, 2019

(86) PCT No.: PCT/GB2019/052423
§ 371 (c)(1),
(2) Date: Mar. 2, 2021

(87) PCT Pub. No.: WO2020/049275
PCT Pub. Date: Mar. 12, 2020

(65) Prior Publication Data
US 2021/0321347 A1    Oct. 14, 2021

(30) Foreign Application Priority Data

Sep. 3, 2018 (GB) ...................................... 1814254

(51) Int. Cl.
*H04W 56/00* (2009.01)
*H04B 10/114* (2013.01)
*H04B 10/2575* (2013.01)

(52) U.S. Cl.
CPC ...... *H04W 56/001* (2013.01); *H04B 10/1143* (2013.01); *H04B 10/25752* (2013.01)

(58) Field of Classification Search
CPC .................... H04B 10/114–116; H04W 56/001
See application file for complete search history.

(56) References Cited

U.S. PATENT DOCUMENTS

2003/0134642 A1* 7/2003 Kostic ..................... H04L 5/023
455/450
2008/0009307 A1* 1/2008 Sekhar ................. H04W 48/10
455/524
(Continued)

FOREIGN PATENT DOCUMENTS

WO    2012088353 A2    6/2012
WO    2018108294 A1    6/2018

OTHER PUBLICATIONS

"International Search Report and Written Opinion of the International Searching Authority", International Application No. PCT/GB2019/052423, dated Jan. 28, 2020, 14 pp.
(Continued)

*Primary Examiner* — Nathan M Cors
(74) *Attorney, Agent, or Firm* — Myers Bigel, P.A.

(57) ABSTRACT

A method for connecting a wireless communication station (STA) with a selected one of a plurality of access points (APs) are described. At least some of the APs are initially substantially unsynchronized in time. The method includes transmitting, by the STA, a beacon request signal via an uplink channel, performing, by the APs and in response to the beacon request signal, a synchronization procedure, the synchronization procedure comprising transmitting, by each of the APs, a respective beacon signal via at least one downlink channel, such that the beacon signals from the plurality of APs are substantially synchronized in time, receiving, by the STA, the beacon signals from the plurality of APs, selecting, by the STA, one of the plurality of APs in dependence on at least one property of the beacon signals, and associating the STA with the selected one of plurality of APs. Related systems and devices are described.

23 Claims, 9 Drawing Sheets

(56) References Cited

U.S. PATENT DOCUMENTS

| | | | |
|---|---|---|---|
| 2010/0209105 A1* | 8/2010 | Shin | H04B 10/1149 398/58 |
| 2011/0170872 A1 | 7/2011 | Shin et al. | |
| 2012/0008959 A1* | 1/2012 | Son | H04B 10/116 398/99 |
| 2012/0051247 A1* | 3/2012 | Erven | H04W 56/001 370/252 |
| 2016/0072581 A1* | 3/2016 | Ikehara | H04B 10/116 398/118 |
| 2019/0261239 A1* | 8/2019 | Wang | H04W 36/08 |

OTHER PUBLICATIONS

"Patents Act 1977: Search Report under Section 17(5)", UKIPO Application No. GB1814254.7, dated Mar. 5, 2019, 4 pp.

Chu, Liwen, et al., "BSS color and multiple BSSID", Submission, IEEE 802.11-16/0068r1, Jan. 18, 2016, 14 pp.

Hamza, Abdelbaset S., et al., "A Survey on Inter-Cell Interference Coordination Techniques in OFDMA-Based Cellular Networks", IEEE Communications Surveys and Tutorials, vol. 15, No. 4, Fourth Quarter 2013, Mar. 7, 2013, pp. 1642-1670.

Miras, David, et al., "A High Data Rate LiFi Integrated System with Inter-cell Interference Management", 2018 IEEE Wireless Communications and Networking Conf. (WCNC), Barcelona, Spain, Apr. 15-18, 2018, 6 pp.

Yoon, Mahnsuk, et al., "AdaptiveScan: The Fast Layer-2 Handoff for WLAN", 2011 Eighth International Conference on Information Technology: New Generations, Las Vegas, NV, Apr. 11, 2011, pp. 106-111.

\* cited by examiner

WIRELESS COMMUNICATION SYSTEM AND METHOD

CROSS-REFERENCE TO RELATED APPLICATIONS

The present application is a 35 U.S.C. § 371 national stage application of PCT Application No. PCT/GB2019/052423, filed Aug. 30, 2019, which itself claims priority to GB Patent Application No. 1814254.7, filed Sep. 3, 2018, the entire contents of both of which are incorporated herein by reference in their entireties. The above-referenced PCT Application was published in the English language as International Publication No. WO 2020/049275 A1 on Mar. 12, 2020.

FIELD

The present invention relates to a wireless communication system and method, for example an optical wireless communication system and method.

BACKGROUND

It is known to provide wireless data communications by using light instead of radio frequencies to transmit and receive data wirelessly between devices. Data may be transmitted using light by modulating at least one property of the light, for example the intensity of the light. Methods that use light to transmit data wirelessly may be referred to as optical wireless communications (OWC) or light communications (LC). LiFi is one form of optical wireless communication.

In Optical Wireless Communication systems (for example, LiFi systems), a number of Access Points (AP) communicate with a number of Stations (STA). Both the Access Points and the Stations are full duplex devices, capable of transmitting and receiving at the same time.

Each AP is connected to a network, for example the internet and provides data. Each AP may also optionally be incorporated into a luminaire to provide illumination. Each AP is able to communicate with multiple stations at the same time, sharing the connection between them. Mobile stations can move from one AP to another, ideally without losing their connection to the network. It is preferred that the handover is be done in such a way that it looks like a seamless transition to the user.

Optical wireless coverage is provided by a plurality of cells, each of which comprises at least one AP configured to provide coverage to STAs within that cell. Full coverage requires overlap of more than one AP's coverage at cell-edges.

Interference, particularly at cell-edge, is a well-known issue in cellular wireless systems that degrades performance.

A cellular system in which the same frequency is used in all cells may be referred to as a cellular system having reuse factor 1.

In cellular systems having reuse factor 1, a STA positioned at a cell boundary may experience significantly poorer performance than a STA in the central coverage area of the cell. Poorer performance may be due to the STA receiving a weaker signal from the cell's AP than if the STA were to be positioned in the centre of the cell. Poorer performance may be due to a received signal from a neighbouring cell's AP being comparable in signal strength to the signal from the AP from which the STA is currently receiving, thereby causing signal interference.

In general, current LiFi networks are not synchronized. There is no coordination between APs in adjacent cells. For example, transmission of beacon signals by the different APs is not coordinated in time. Each AP transmits a beacon signal periodically. The beacon signal is a signal that announces the presence of the AP Different APs may transmit beacon signals on different schedules, such that transmission of a beacon signal by one AP may occur at a different time from transmission of a beacon signal by a neighbouring AP.

A beacon signal transmitted by an AP is received by STAs within the AP's coverage. On receipt of the beacon signal by a STA that is not yet associated with the AP, the STA may send a request to associate with the AP.

FIG. 1 is a schematic illustration of a simple LiFi network having two cells. Coverage in a first cell is provided by a first AP 1 having a first field of view (FOV) 3. Coverage in a second cell is provided by a second AP 2 having a second FOV 4.

A station 10 is associated with the first AP 1. The station 10 is positioned at an edge of the FOV 3 of the first AP 1 cell-edge. The station 10 is positioned such that it also falls within the FOV 4 of the second AP 2. Therefore, it may be expected that the station 10 will be subject to some cell-edge interference.

When a station moves from within a central location for the FOV of a given cell to its cell-edge, a neighbouring AP's signal may become increasingly stronger. In the example of FIG. 1, as the station 10 moves towards an edge of FOV 3 (shown in FIG. 1 as a right edge of FOV 3), the signal from the second AP 2 that is received by the station 10 may become increasingly stronger.

Since APs in known LiFi systems are asynchronous and uncoordinated, the station 10 may not have a chance to handover, i.e. to associate to the neighbouring AP 2, for a period of time. The lack of handover may cause the signal to interference and noise ratio (SINR) and/or the throughput of the STA to drop significantly.

A significant amount of work on cell-edge interference has been conducted for radio frequency (RF) cellular networks. Some of these approaches have also been adopted for optical wireless communications (OWC) networks, for example LiFi cellular networks. In some known systems, cell-edge interference is mitigated by time/frequency/space separation of the desired and interference signals, randomization of the interference, or power adjustment.

Some proposed methods to control co-channel interference at cell borders may comprise at least one of:

a. Scheduling and resource allocation, e.g. fractional frequency reuse;
b. Interference randomization, e.g. multi-phase transmission and interference cancellation at the receiver;
c. Transmit power adjustment;
d. Interference estimation and cancellation at the receiver;
e. Using the spatial dimension of the channel to separate the interference, e.g. beam alignment cooperative communication using relays (and possibly one of the above).

At least some of the above methods may make use of network (APs) coordination, in which APs are controlled at a network level. At least some of the above methods may make use of a feedback link. At least some of the above methods may incur a high computational cost. At least some of the above methods use RF signal properties such as signal/channel phase and multipath. We consider each type of method in turn.

Typically, scheduling or time domain multiplexing (interference signal separation in time domain) requires network/AP synchronization and costly protocols in terms of implementation, latency and spectrum efficiency.

Use of a frequency reuse factor larger than 1, e.g. fractional frequency reuse (at the cell-edge), or frequency multiplexing, requires use of network coordination and planning and costs in spectrum efficiency.

Space separation as used in RF by employing multiple antennas is not possible in optical wireless communications. Other kinds of directional transmission may not mitigate cell-edge interference as there will be coverage overlap in any case.

Signal randomization as it is used in the RF domain, for example by transmitting a signal in different phases, may not be possible in optical wireless communications.

Power adjustment as is used in RF to mitigate cell-edge interference may not be possible in optical wireless communications unless the AP is able to change the transmit power at the cell edge. Power adjustment may require network/AP coordination.

In the case of a LiFi cellular network with limited implementation/protocol complexity, it may be the case that none of the above-mentioned techniques is applicable without major changes to hardware and overall systems architecture. For example, implementing network coordination may increase cost and complexity while consuming system resource and efficiency in the frequency or time domains.

Nevertheless, cell-edge interference may be a major factor in the degradation of network performance in optical wireless communication systems, for example LiFi.

SUMMARY

In a first aspect of the invention, there is provided a method for connecting a wireless communication station (STA) with a selected one of a plurality of access points (APs), wherein at least some of the APs are initially substantially unsynchronized in time, the method comprising: transmitting, by the STA, a beacon request signal via an uplink channel; performing, by the APs and in response to the beacon request signal, a synchronization procedure, the synchronization procedure comprising transmitting, by each of the APs, a respective beacon signal via at least one downlink channel, such that the beacon signals from the plurality of APs are substantially synchronized in time; receiving, by the STA, the beacon signals from the plurality of APs; selecting, by the STA, one of the plurality of APs in dependence on at least one property of the beacon signals; and associating the STA with the selected one of plurality of APs.

The STA may comprise an optical wireless communication (OWC) STA. The APs may comprise OWC APs. The uplink channel may comprise an optical channel. The downlink channel or channels may comprise at least one optical channel.

The at least one property of the beacon signals may comprise a received signal strength. The selecting of the one of the pluralities of APs may be in dependence on a comparison of a respective received signal strength of each of the beacon signals.

The STA may initially be associated with one of the plurality of APs. The transmitting of the beacon request signal by the STA may be in response to identifying, by the STA, a signal from a different one of the plurality of APs.

The synchronization procedure may further comprise setting, by each of the APs, a time for a beacon transmit window (BTW) in which the beacon signals are transmitted, thereby synchronizing the beacon signals transmitted by the APs.

The setting of the beacon transmit window may be in response to the beacon request.

Each of the APs may be configured to transmit periodic beacon signals via the at least one downlink channel. Each of the periodic beacon signals may be transmitted within a respective periodic beacon transmit window. The periodic beacon transmit windows may be separated in time by a periodic inter beacon interval (T_b).

The method may further comprise, after the synchronization procedure, transmitting by the APs further periodic beacon signals such that the periodic beacon signals transmitted by all of the APs are substantially synchronized in time.

The beacon signals may be sent in response to the beacon request signal. For at least one of the APs, an interval (T_c) between the beacon signal sent in response to the beacon request signal and an immediately preceding beacon signal may be different from the periodic inter beacon interval (T_b).

For at least one of the APs, setting the BTW in which the beacon signals are to be transmitted may comprise resetting a periodic beacon transmit window.

The beacon request signal may be received by the APs at time t_0. The time for the BTW may be set as t_0+T_c, wherein T_c is greater than or equal than the normal inter beacon interval (T_b).

The synchronization procedure may further comprise transmitting, by a first one of the APs, a delay request in response to the beacon request signal. The synchronization procedure may further comprise receiving, from the STA, a further beacon request signal in response to the delay request.

A time of transmission of the delay request may be dependent on a scheduled beacon transmit window of the first one of the APs.

A time of transmission of the further beacon request signal may be dependent on the time of transmission of the delay request.

The delay request may be transmitted in response to the beacon request signal and in response to the first one of the APs being already synchronized with a second one of the APs.

The synchronization procedure may further comprise resetting, by a third one of the APs, a beacon transmit window in response to the beacon request signal and the further beacon request signal. The synchronization procedure may further comprise transmitting, by the third one of the APs, a beacon reset request in response to the beacon request signal and the further beacon request signal, the beacon reset request communicating the rescheduling of the beacon transmit window.

A timing of the beacon reset request may be set by the third AP in dependence on the timing of the further beacon request signal. A timing of the reset beacon transmit window may be set by the third AP in dependence on the timing of the further beacon request signal.

The beacon transmit window may comprise a plurality of beacon transmit slots. Each of the APs may be configured to select a respective one of the beacon transmit slots for transmission of a beacon signal in dependence on at least one of a) to d):

a) whether the AP has transmitted a delay request;
b) whether the AP has transmitted a beacon reset request;
c) if the AP has transmitted a beacon reset request, whether the beacon reset request was in response to a beacon request;

d) if the beacon reset was in response to a beacon request, whether the beacon request was of a first type or a second type.

Each of the plurality of APs may be allocated a respective at least one pseudonoise sequence for use in uplink and/or downlink communications. The beacon signal transmitted by each of the APs may comprise an indication of the at least one pseudonoise sequence allocated to that AP. The method may further comprise identifying, by the STA, frames originating from an AP to which the STA is associated using the allocated pseudonoise sequences.

Each beacon signal may comprise a common pseudonoise sequence that is used to identify signals as beacon signals.

The beacon request signal may comprise a pseudonoise sequence that is used to identify signals as beacon request signals.

The STA may be configured to reject based on the allocated signals sent by any of the APs to which the STA is not associated based on the allocated pseudonoise sequence.

The method may further comprise, after the STA is connected to the selected AP, receiving by the STA further frames from the selected AP, and identifying by the STA the further frames using the at least one pseudonoise sequence allocated to the selected AP.

At least some of the plurality of APs may transmit their beacon signals using a common downlink channel. At least some of the plurality of APs may transmit their beacon signals using a common transmission frequency.

The transmitting of the beacon signals by the APs may be synchronized at a local level without timing of the beacon signals being controlled by a network-level controller.

The uplink channel may comprise at least one of visible light, infrared light, optical light. The at least one downlink channel may comprise at least one of visible light, infrared light, optical light.

The beacon request signals may be transmitted using an OWC protocol. The beacon signals may be transmitted using the OWC protocol. The OWC protocol may comprise a LiFi protocol. The OWC protocol may support full duplex communication.

In a further aspect of the invention, which may be provided independently, there is provide an optical wireless communication (OWC) system comprising: a STA configured to transmit a beacon request signal via an uplink channel. The OWC system further comprises a plurality of APs. At least some of the APs are initially substantially unsynchronized in time. The plurality of APs is configured to perform, in response to the beacon request signal, a synchronization procedure. The synchronization procedure comprises transmitting by each of the plurality of APs a respective beacon signal via at least one downlink channel, such that the beacon signals from the plurality of APs are substantially synchronized in time. The STA is further configured to receive the beacon signals from the plurality of APs, to select one of the plurality of APs in dependence on at least one property of the beacon signals, and to associate with the selected one of plurality of APs.

The system may be configured to perform a method as claimed or described herein.

In an further aspect of the invention, which may be provided independently, there is provides a station (STA) configured to transmit a beacon request signal via an uplink channel; receive from each of a plurality of APs a respective beacon signal via at least one downlink channel, wherein the beacon signals from the plurality of APs are substantially synchronized in time; select one of the plurality of APs in dependence on at least one property of the beacon signals; and associate with the selected one of plurality of APs.

The STA may comprise an OWC STA. The uplink channel may comprise an optical channel. The downlink channel or channels may comprise at least one optical channel.

The STA may initially be associated with one of the plurality of APs. The STA may be configured to transmit the beacon request signal in response to identifying, by the STA, a signal from a different one of the plurality of APs.

The STA may be further configured to transmit a further beacon request signal in response to receiving a delay request from one of the APs.

The STA may be further configured, in response to receiving a beacon reset request from one of the APs, to adjust an interval in which the STA receives beacon signals.

In a further aspect of the invention, which may be provided independently, there is provide an AP configured to receive a beacon request signal from a STA and, if the AP is already synchronized to at least one further AP, to transmit a delay request in response to the beacon request signal.

In a further aspect of the invention, which may be provided independently, there is provided an AP configured to receive a beacon request signal and a further beacon request signal from an STA and, in response to the beacon request signal and the further beacon request signal, to reset a beacon transmit window and to transmit a beacon reset request, the beacon reset request communicating the rescheduling of the beacon transmit window.

BRIEF DESCRIPTION OF THE DRAWINGS

Various aspects of the invention will now be described by way of example only, and with reference to the accompanying drawings, of which.

DETAILED DESCRIPTION OF THE DRAWINGS

The term light herein may be used, for example, to refer to electromagnetic waves with wavelengths in a range 1 nm to 2500 nm, which includes ultraviolet, visible light and near-infrared wavelengths.

Embodiments described below are described in terms of optical wireless communication systems, for example LiFi systems. However, in other embodiments, methods described below may be applied to any form of cellular wireless systems, for example RF systems.

Figure 2:
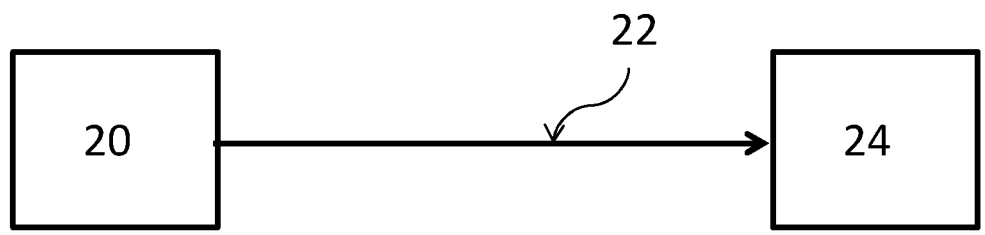
FIG. 2 is a block diagram of a transmitter and receiver using optical wireless communication.

FIG. 2 is a block diagram illustrating principles of optical wireless communication according to embodiments. FIG. 2 shows a transmitter apparatus 20 and a receiver apparatus 24. The transmitter apparatus 20 is configured to send wireless optical signals in which information is encoded through an optical communication channel 22 to the receiver apparatus 24. The optical communication channel 22 may be a free-space communication channel. The optical communications channel 22 has a characteristic optical wavelength.

Free space communication channels include transmission of optical signals through air, space, vacuum, liquid such as water or similar.

Transmitters and receivers may be provided on different devices. One type of device that is used is an access point (AP). Access points may provide access to a further network, for example the internet. Another type of device is a station (STA). Stations may be portable or fixed. Without limitation, examples of stations include personal computers, desktops, laptops and smart devices, including mobile devices (for example, mobile phones, tablets or digital book readers). Portable stations may be powered by their own battery resource.

An access point may provide data transmission to and/or from a wired network or a Wi-Fi™ or other wireless network and/or other optical wireless communications network, optionally a LiFi network.

The transmitter apparatus 20 includes a light emitting diode (LED), laser or other suitable light source, and an associated driving circuit to drive the LED or laser to produce the optical signal. The associated driving circuitry includes a digital to analogue convertor configured to provide a modulation signal at a frequency characteristic of an optical light communication signal. A further processor, provided as part of the transmitter apparatus or associated with the transmitter apparatus, modulates data onto a drive current and the driving circuitry provides the drive current to the LED or laser. The LED or laser then produces an outgoing modulated optical wireless communication signal that carries the data.

The receiver apparatus 24 includes a photodiode, or other suitable light detector, with associated circuitry to condition any received signal. The photodiode converts received light to an electronic signal which is then conditioned by the conditioning circuitry. Conditioning may include one or more filter steps; amplification of a weak electrical signal; equalisation of received signals and converting the analogue signals into digital signals using an analogue to digital convertor. The digital signal can then be provided to a further processor, provided as part of the receiver apparatus or associated with the receiver apparatus, to be demodulated to extract communication data.

Any suitable modulation scheme may be used. For example, orthogonal frequency division multiplexing (OFDM) modulation schemes are used in some embodiments, and the demodulation is from the OFDM modulation scheme. In further embodiments and without limitation, other modulation schemes may be used, for example on-off keying (OOK), phase shift keying (PSK), M-ary pulse amplitude modulation (M-PAM), M-ary quadrature amplitude modulation (M-QAM), Discrete Hartley transformation, Wavelet packet division multiplexing (VVPDM), Hadamard coded modulation (HCM), pulse-position modulation (PPM), Colour shift keying (CSK), carrier-less amplitude and phase (CAP), or discrete multi-tone (DMT). The light may be modulated at a modulation rate between 1 kHz and 1 PHz, for example at a modulation rate between 1 MHz and 100 GHz.

The modulation scheme may form part of an OWC communication protocol, such that the optical signal is produced according to the OWC communication protocol. The OWC communication protocol may be packet-based.

Figure 3:
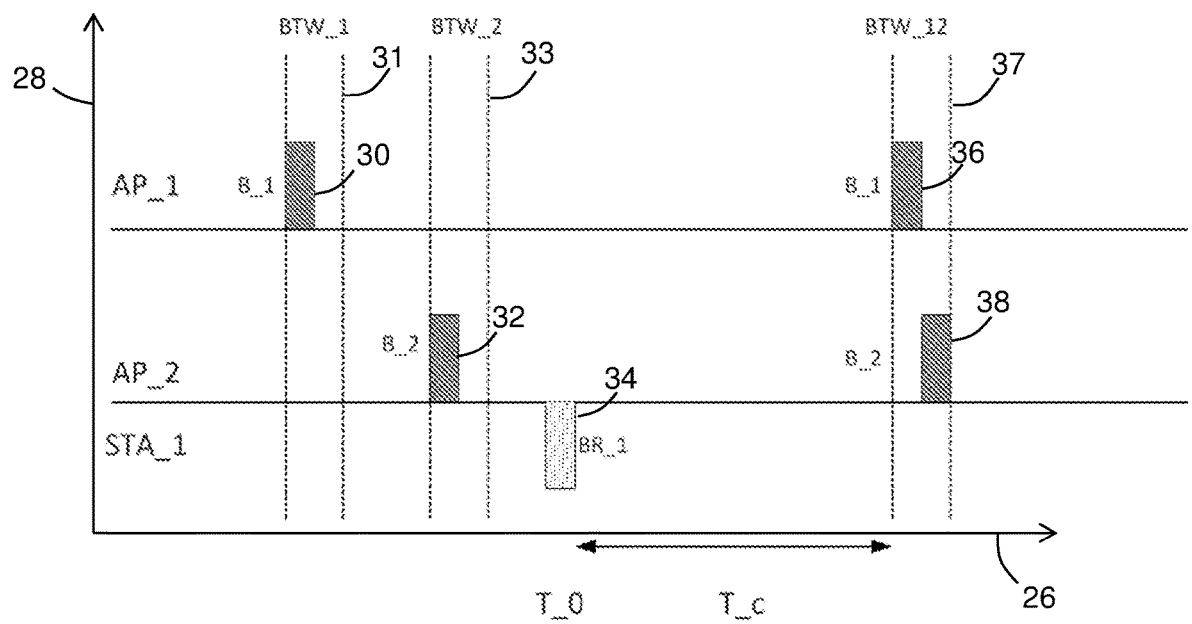
FIG. 3 is a schematic illustration of a beacon request process in accordance with an embodiment, in which beacon transmit windows are synchronized using a beacon request transmitted from a station.

FIG. 3 is a schematic illustration of an optical wireless communication method in accordance with an embodiment. The optical wireless communication method of FIG. 3 is performed by an optical wireless system as illustrated in FIG. 1, which comprises a first AP 1 having a first FOV 3, a second AP 2 having a second FOV 4, and a station 10 which is associated with the first AP 1 and positioned at the cell-edge of the first FOV 3 such that it is also within the second FOV 4.

Figure 1:
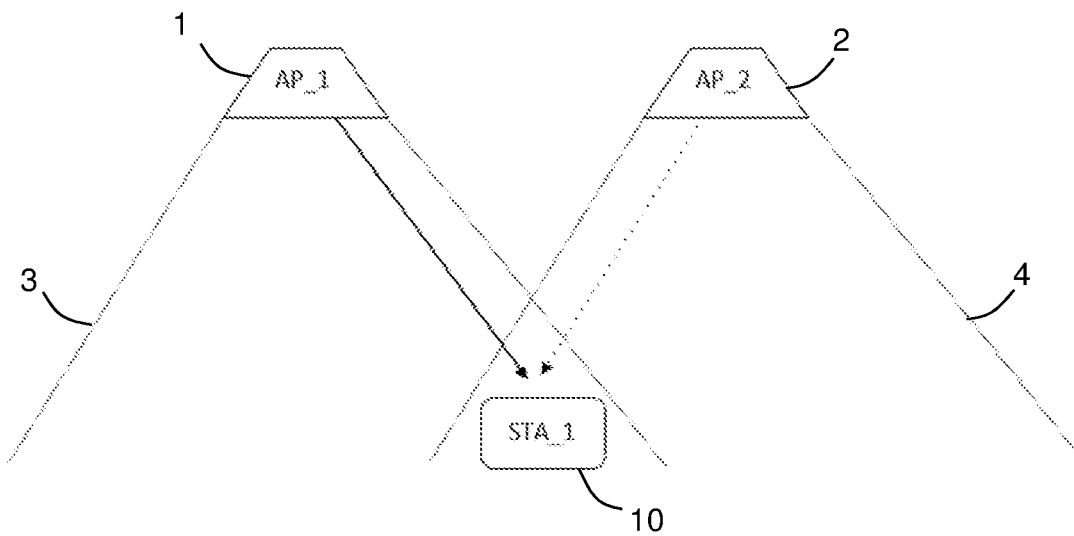
FIG. 1 is a schematic illustration of a wireless communication system comprising two access points and a station, wherein the station is within the FOV of each of the APs.

In FIG. 1, the first AP 1 is denoted as AP_1, the second AP 2 is denoted as AP_2, and the station 10 is denoted as STA_1. This naming of the APs and station is also used in FIG. 3, and in the description below.

FIG. 3 is a plot in which a horizontal axis 26 represents time from left to right. A vertical axis 28 is divided into three sections: upper, middle and lower.

The upper section is labelled AP_1 and is representative of OWC signals sent by the first AP 1. OWC signals sent by the first AP 1 are sent via a first downlink channel, which in the present embodiment is an optical channel using visible light.

The middle section is labelled AP_2 and is representative of OWC signals sent by the second AP 2. OWC signals sent by the second AP 2 are sent via a second downlink channel, which in the present embodiment is an optical channel using visible light. The second downlink channel may be the same as the first downlink channel. For example, the first downlink channel and second downlink channel may comprise light of the same frequency.

The lower section is labelled STA_1 and is representative of OWC signals sent by the station 10. OWC signals sent by the station 10 are sent via an uplink channel, which in the present embodiment is an optical channel using infrared light.

In other embodiments, APs and STAs may communicate using any suitable uplink and downlink channels. Any suitable number of channels may be used. In some circumstances, channels may be shared by 2 or more devices. Channels may comprise optical channels in which signals are sent using visible, infrared or ultraviolet light. In further embodiments, one or more of the channels may comprise a non-optical channel in which wireless communication may be performed using any suitable wireless communication method.

FIG. 3 illustrates a plurality of OWC signals as boxes 30, 32, 34, 36, 38. For each box 30 to 38, the horizontal position of the box 30, 32, 34, 36, 38 represents a time at which the signal is sent, and the vertical position of the box 30, 32, 34, 36, 38 represents the device (AP_1, AP_2 or STA_1) by which the signal is sent.

At the start of the method of FIG. 3, STA_1 is associated with AP_1 as illustrated in FIG. 1. AP_1 and AP_2 are not synchronized with each other.

We consider the signals 30, 32, 34, 36, 38 from left to right, i.e. as time increases.

AP_1 is configured to send beacon signals periodically, at regular intervals. Each beacon signal is sent within a respective predefined window of time, which may be referred to as a beacon transmit window (BTW). The beacon transmit windows are separated in time by a periodic inter beacon interval T_b. The beacon transmit windows in which normal periodic beacon signals are sent may be referred to as periodic beacon transmit windows.

In the present embodiment, the periodic inter beacon interval T_b is 100 ms. In other embodiments, any suitable T_b may be used.

In the present embodiment, the length of each beacon transmit window is 1 ms. In other embodiments, any suitable length of beacon transmit window may be used.

In the present embodiment, the time taken to transmit a beacon signal, which may also be referred to as a beacon frame, is 230 μs. Each beacon transmit window may be considered to comprise four time periods (which may be referred to as slots) in which a beacon signal can be transmitted. A method of choosing in which of the four slots in the beacon transmit window to transmit the beacon signal is described below with reference to FIG. 11. In the description of the present embodiment, we will describe the beacon transmit window in which each beacon signal is transmitted, without specifying a slot within the beacon transmit window.

Signal 30 of FIG. 3 is a beacon signal which is sent by AP_1 within a first beacon transmit window 31. In FIG. 3, the beacon signal is labelled as B_1 because it is sent by AP_1. The beacon transmit window 31 is labelled as BTW_1 because it is a beacon transmit window used by AP_1.

The beacon signal 30 is received by any stations within the FOV 3 of AP_1. In this example, the only station within the FOV 3 of AP_1 is STA_1.

AP_2 is configured to send beacon signals periodically within beacon transmit windows that are separated in time by a periodic inter beacon interval T_b. In the present embodiment, the length of each periodic beacon transmit window is the same for AP_2 as for AP_1, i.e. 1 ms. The periodic inter beacon interval T_b is the same for AP_2 as for AP_1. However, since AP_2 is not synchronized with AP_1, the beacon transmit windows for AP_2 occur at different times from those of AP_1.

Signal 32 of FIG. 3 is a beacon signal which is sent by AP_2 within a second beacon transmit window 33. In FIG. 3, the beacon signal is labelled as B_2 because it is sent by AP_2. The second beacon transmit window 33 is labelled as BTW_2 because it is the beacon transmit window used by AP_2.

In the present embodiment, BTW_2 occurs after BTW_1. In general, BTW_2 may not occur at the same time as BTW_1 if AP_1 and AP_2 have not been synchronized.

The beacon signal 32 is received by any stations within the FOV 4 of AP_2. In this example, the only station within the FOV 4 of AP_2 is STA_1. Because STA_1 is associated with AP_1 at the start of the process of FIG. 3, the beacon signal 32 from AP_2 may be considered to be an interference signal.

Because the beacon signals 30 and 32 from the different APs are received by STA_1 at different times, STA_1 may not be able to perform a comparison of the beacon signals 30, 32 to determine whether a handover from AP_1 to AP_2 should be performed.

On receiving the beacon signal B_2 from the neighbouring AP, AP_2, which may be considered to be an interference signal, STA_1 sends signal 34. Signal 34 is a beacon request signal which is shown in FIG. 3 as BR_1 because it is sent by STA_1.

The beacon request signal BR_1 is a type of handshaking signal which acts as a trigger for synchronization of APs that receive the beacon request signal. The beacon request signal BR_1 is received by all relevant APs that can communicate to the STA, i.e. the APs within the STA's FOV.

In the example of FIG. 3, the APs within the FOV of STA_1 are AP_1 and AP_2. The beacon request signal BR_1 is received by AP_1 and AP_2.

The time at which the beacon request signal BR_1 is received by AP_1 and AP_2 may be designated as t_0 as shown in FIG. 3.

In response to receiving the beacon request signal BR_1, each of the APs resets its beacon transmit window such that its next beacon transmit window takes place after a time interval T_c. Time interval T_c is defined as the time between the receiving of the beacon request signals BR_1 and the next beacon transmit window. The next beacon transmit window is set to occur at time t_0+T_c.

In FIG. 3, the next beacon transmit window 37 is shown as BTW_12, to indicate that AP_1 and AP_2 transmit beacon signals during the same beacon transmit window BTW_12.

Signal 36 is a beacon signal B_1 which is transmitted by AP_1 within beacon transmit window BTW_12. Signal 38 is a beacon signal B_2 which is transmitted by AP_2 within beacon transmit window BTW_12.

Time interval T_c is set such that T_c is greater than or equal to T_b, where T_b is the normal periodic inter beacon interval. Therefore, an AP receiving the beacon request signal BR_1 may wait longer to transmit a next beacon signal than would be the case if the AP were transmitting beacon signals on a normal periodic schedule.

By resetting the beacon transmit window, all APs with coverage to the STA may be synchronized. Once synchronized, all the APs share the same beacon transmit window.

Although only two APs are shown in FIG. 1 and FIG. 3, in other embodiments any number of APs may be synchronized using a method as described above in which a station sends a beacon request signal to APs in range of the station, and in response the APs synchronize their beacon transmit windows to the beacon request signal.

Figure 4:
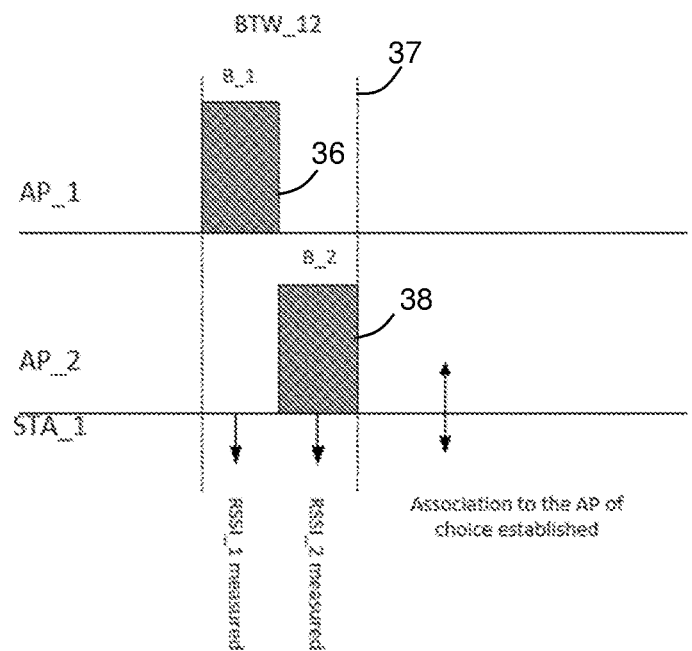
FIG. 4 is a schematic illustration of a power comparison process in which the received signal strength indication of two beacon signals is measured and compared during a beacon transmit window.

The beacon signals 36, 38 that are sent by AP_1 and AP_2 in BTW_12 are received by STA_1. FIG. 4 is a schematic illustration of a process of signal comparison as performed by STA_1. The horizontal axis of FIG. 4 represents time. The vertical axis of FIG. 4 is divided into sections with an upper section representing AP_1, a middle section representing AP_2, and a lower section representing STA_1.

FIG. 4 focuses on the beacon transmit window BTW_12 that has been synchronized in response to the beacon request signal BR_1. Signal 36 is the beacon signal B_1 which is transmitted by AP_1 within beacon transmit window BTW_12. Signal 38 is the beacon signal B_2 which is transmitted by AP_2 within beacon transmit window BTW_12.

The beacon signals B_1 and B_2 that are transmitted within BTW_12 are received by the station STA_1 within a narrow time interval.

STA_1 measures the signal power from all of the APs in range of the STA, which in this embodiment is AP_1 and AP_2. Receiving all AP beacons within a specified time interval provides a received signal power comparison that is meaningful.

STA_1 measures the signal power of AP_1 and AP_2 using the beacon signals B_1 and B_2 that were transmitted in BTW_12.

In the present embodiment, the STA identifies each beacon using the source MAC address. In other embodiments, any suitable method of identifying each beacon may be used. For example, the STA may identify each beacon using an AP identifier in the beacon.

In the present embodiment STA_1 obtains a received signal strength indication (RSSI). The measured signal power of AP_1 is shown as RSSI_1 and the measured signal power of AP_2 is shown as RSSI_2.

STA_1 determines whether the signal power of AP_1 or AP_2 is stronger by comparing RSSI_1 and RSSI_2. In general, STA_1 associates with the AP with the strongest signal. If the signal power of AP_1 is stronger, STA_1 remains associated with AP_1. If the signal power of AP_2 is stronger, a handover occurs in which STA_1 associates with AP_2.

In the present embodiment, each of RSSI_1 and RSSI_2 is an average RSSI obtained over a time period. STA_1 is configured to switch association from one AP to another if the difference in average RSSI between the APs is above 5 dB for a certain period of time. In other embodiments, any suitable criterion for switching association may be used.

The measuring of the signal power from the APs is used to assist the handover process. The APs are synchronized in response to the trigger of the beacon request signal sent by the STA. Once synchronized, all AP beacons are received within a specified time interval, such that the received signal power comparison is meaningful.

Synchronization and coordination of APs through a network may require considerable effort and/or system complexity. In contrast, the APs in the embodiment of FIGS. 3 and 4 are not initially coordinated at all, but become coordinated in response to the beacon request signal. The process of coordination in response to the beacon request signal may be affordable and/or relatively efficient.

The synchronization of APs may be achieved without network-level control. The synchronization of APs in the embodiment of FIGS. 3 and 4 may not require network synchronization and an extra protocol which may require more complex algorithms and hardware.

To improve SINR and throughput at the cell edge, a mechanism is provided so that handover can happen at the right time, for example when the neighbouring AP's signal becomes dominant. Such a mechanism reviews the STA association based on the respective APs' signals tested at predefined intervals. This is facilitated by the STA receiving beacons at substantially the same time (synchronously) to be able to measure the signal strength and make the handover decision.

Figure 5:
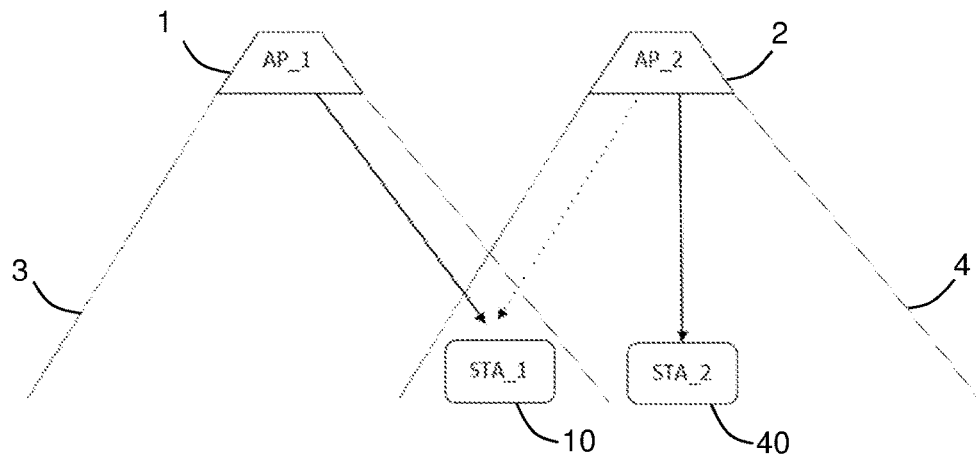
FIG. 5 is a schematic illustration of a wireless communication system comprising two access points and two stations.

FIG. 5 is a schematic illustration of a further arrangement of APs and STAs. As was the case in FIG. 1, FIG. 5 shows a first AP 1 having a FOV 3, a second AP 2 having a FOV 4, and a station 10 which is positioned at a cell edge such that it is within the FOV 3, 4 of both APs. Station 10 is initially associated with the first AP 1.

In FIG. 5, a second station 40 is also present in the FOV 4 of the second AP 2. The second station 40 is positioned centrally in the FOV 4 of the second AP 2, and is not within the FOV of the first AP 1.

Again, the first AP 1 is denoted by AP_1, the second AP 2 is denoted by AP_2, and the station 10 is denoted by STA_1. The additional station 40 is denoted by STA_2.

We consider an embodiment of a communication method using the wireless system illustrated in FIG. 5.

Initially, STA_1 is associated with AP_1 as described above, and STA_2 is associated with AP_2. AP_2 is in transmission/association with STA_2. AP_2 and STA_2 are in active interaction over the channel, with AP_2 sending downlink packets to STA_2. Since AP_2 and STA_2 are in active interaction, STA_1 may suffer interference from downlink packets sent from AP_2 to STA_2 (and not intended for STA_1).

STA_1 moves into the FOV of AP_2 and transmits a beacon request signal BR_1, as described above in relation to FIG. 3.

The beacon request signal BR_1 is received by AP_1 and AP_2 at a time which is designated as t_0. At time t_0, AP_2 is in the process of transmitting frames to STA_2. Since AP_2 is currently transmitting to STA_2, it is desirable that AP_2 does not terminate the transmission to STA_2 prematurely.

Upon receiving BR_1 from STA_1, AP_1 and AP_2 each set their next beacon transmit window BTW_12 to t_0+T_c as described above in relation to FIG. 3. By including the time interval T_c, AP_2 has enough time to continue its frame transmissions to STA_2. AP_2 can complete its transmission to STA_2.

The next beacon transmit window BTW_12 occurs after the completion of transmission to STA_2.

By using time interval T_c which is longer than a normal periodic beacon interval T_b, AP_1 and AP_2 with coverage to STA_1 may be synchronized, even though AP_2 is in transmission to STA_2. The system may avoid premature termination of transmission to STA_2.

In the embodiments described above, we have introduced one handshaking signal, a beacon request signal, which is transmitted by a station STA_n when a signal from an interfering access point AP_m is received by the station STA_n. This beacon request signal may also be described as a beacon request type 1, BR_n_1.

We now consider embodiments in which further handshaking signals are used in addition to the beacon request signal. In a situation in which one or more APs interfering to a given STA are already synchronized with one or more further APs, more signalling and handshakes between the STA and the relevant APs may be used than those described above with reference to FIG. 3. The use of more signalling and handshakes may allow previously-unsynchronized APs to be synchronized together, while taking account of any further APs to which APs are already synchronized.

A delay request signal, DR_m, is used in a situation in which one or more APs interfering at the STA are already synchronized with one or more further APs. The delay request is transmitted by an AP_m after a beacon request type 1, BR_n_1, is received by AP_m. The delay request announces the BTW_m timing of AP_m.

A beacon request type 2, BR_n_2, is transmitted by a station STA_n when a DR_m is received by the station STA_n. The DR_m that is received by the STA_n was transmitted by the station AP_m in response to a beacon request type 1, BR_n_1. The beacon request type 2, BR_n_2, is transmitted by the station STA_n to request synchronization of the BTWs with the received DR_m.

A beacon reset request, BRR_m, is transmitted by an access point AP_m when it receives both a beacon request type 1, BR_n_1, and a beacon request type 2, BR_n_2. The beacon reset request BRR_m asks all of the STAs that are within range of AP_m to resynchronize the BTWs.

We now describe embodiments in which the additional handshaking signals are used.

Figure 6:
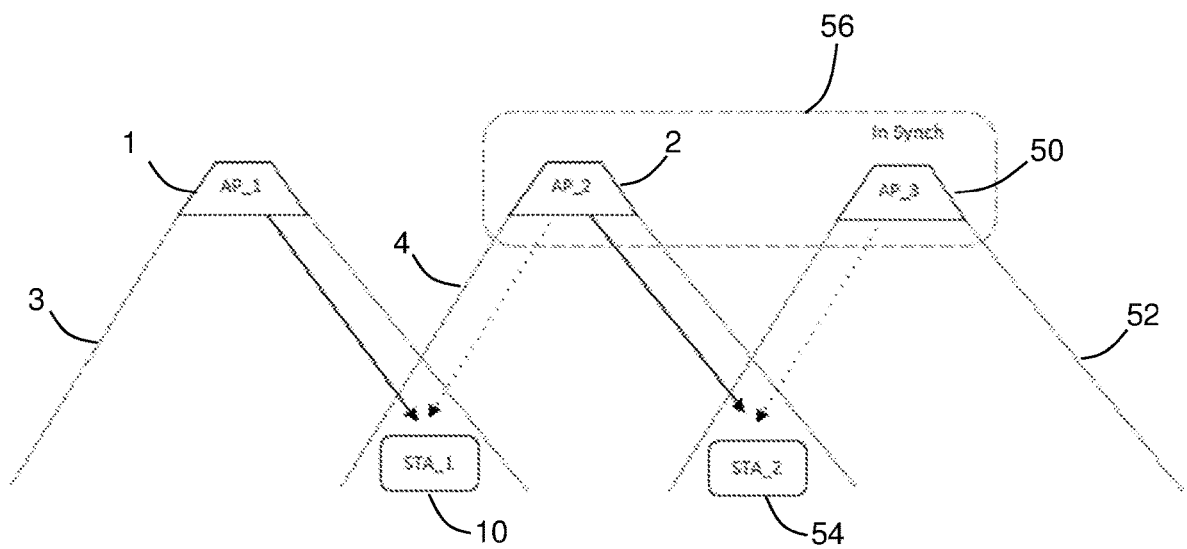
FIG. 6 is a schematic illustration of a wireless communication system comprising three access points and two stations.

FIG. 6 is a schematic illustration of a further arrangement of APs and STAs. As was the case in FIG. 2, FIG. 6 shows a first AP 1 having a FOV 3, a second AP 2 having a FOV 4, and a station 10 which is positioned at a cell edge such that it is within the FOV 3, 4 of both APs. Station 10 may be referred to as the first station. Initially, station 10 is associated with the first AP 1 and is moving towards the coverage of the second AP 2.

A third AP 50 has a third FOV 52 which overlaps with the second FOV 4. A second station 54 is positioned near to the edge of the second FOV 4, such that it is also positioned within the third FOV 52. Initially, the second station 54 is associated with the second AP 2. The second station is denoted in FIG. 6 as STA_2.

Initially, the second AP 2 is already synchronized with the third AP 50. The second AP 2 and the third AP 50 are configured to transmit periodic beacon signals on the same periodic schedule, such that they transmit periodic beacon signals within the same beacon transmit windows BTW_23. A dotted line 56 in FIG. 6 is used to show which APs are initially synchronized.

If a simple beacon request signal were to be used as described above, it could be the case that requesting the second AP 2 to become synchronized with the first AP 1 could cause the beacon transmit window synchronization with the third AP 50 to be lost. The method described below avoids such a loss of synchronization by the use of additional handshaking signals.

Again, the first AP 1 is denoted by AP_1, the second AP 2 is denoted by AP_2, and the station 10 is denoted by STA_1. The third AP 50 is denoted by AP_3. The second station 54 is denoted by STA_2.

Figure 7:
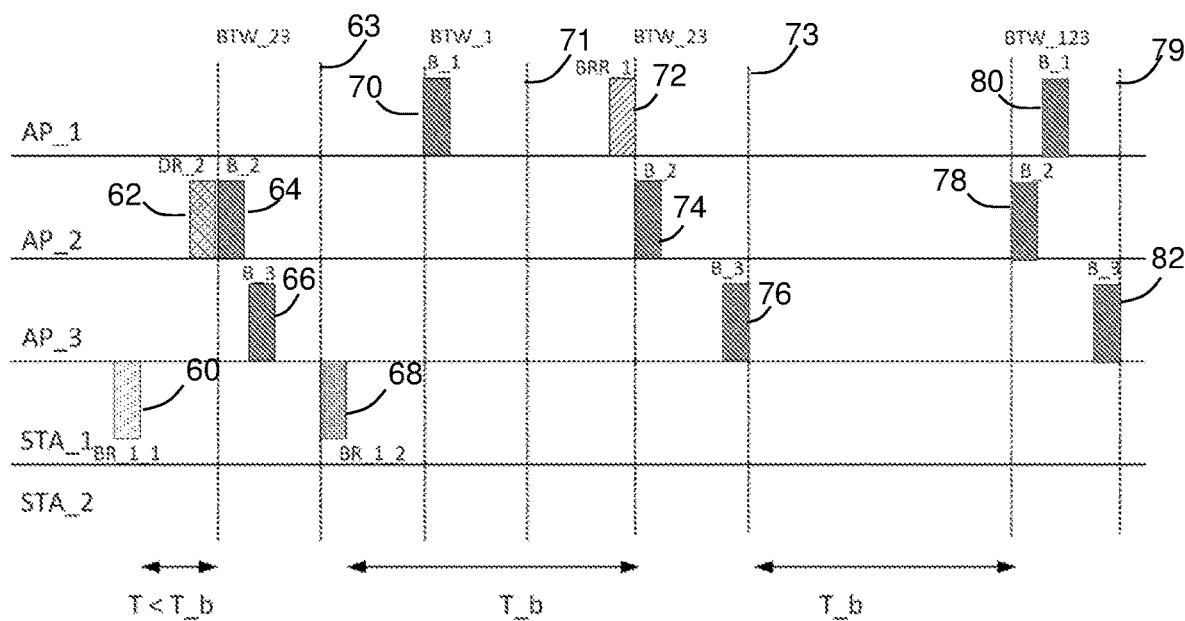
FIG. 7 is a schematic illustration of a signalling process in accordance with an embodiment.

FIG. 7 is a schematic illustration of an optical wireless communication method in accordance with an embodiment. The optical wireless communication method of FIG. 7 is performed by an optical wireless system as illustrated in FIG. 6.

The horizontal axis of FIG. 7 represents time. The vertical axis of FIG. 7 is divided into five sections representing, from top to bottom, AP_1, AP_2, AP_3, STA_1 and STA_2. Signals are represented by boxes 60, 62, 64, 66, 68, 70, 72, 74, 76, 78, 80, 82. Boxes 60, 62, 64, 66, 68, 70, 72, 74, 76, 78, 80, 82 are positioned on the horizontal axis in accordance with time, and on the vertical axis in accordance with the device from which the signal was sent.

AP_2 is originally in transmission to STA_2.

Signal 60 of FIG. 7 is a beacon request signal of type 1 which is sent by STA_1. Signal 60 is indicated by BR_1_1 to show that it is sent by STA_1 and is of type 1. The beacon request signal 60 is sent in response to an interfering signal from AP_2 (not shown in FIG. 7) received by STA_1 when STA_1 has appeared in the coverage of AP_2.

Beacon request signal 60 is received by all APs within range of STA_1. In this example, the APs within range of STA_1 are AP_1 and AP_2. Beacon request signal 60 is not received by AP_3, because AP_3 is not within range of STA_1.

Upon receiving the beacon request signal 60 (BR_1_1), AP_2 sends back signal 62, which is a delay request (shown in FIG. 7 as DR_2). AP_2 is already in transmission to STA_2. AP_2 sends back the DR_2 immediately before a first beacon transmit window 63 (shown in FIG. 7 as BTW_23 as it is a window in which beacon signals are transmitted by AP_2 and AP_3). The delay request DR_2 announces the timing of the periodic beacon transmit window 63 that is about to occur. The timing of the periodic beacon transmit window 63 was set in response to a beacon request BR_2 (not shown) from STA_2 that occurred at some point in the past.

The time T between the beacon request BR_1_1 and the delay request DR_2 is less than the normal periodic inter beacon interval T_b.

The delay request DR_2 is received by the STAs that are within range of AP_2, which in this example are STA_1 and STA_2.

After transmitting the delay request DR_2, AP_2 transmits a beacon signal 64 (shown as B_2) within beacon transmit window 63. AP_3 transmits a beacon signal 66 (shown as B_3) within beacon transmit window 63.

In response to the delay request DR_2, STA_1 schedules a delayed beacon request signal 68 (shown as BR_1_2). The delayed beacon request signal 68 is scheduled to be transmitted after the end of beacon transmit window 63 (BTW_23). The delayed beacon request signal 68 (BR_1_2) may be described as being a beacon request signal of type 2, since it is a beacon request signal that is sent in response to a delay request.

Beacon request signals of type 1 and type 2 may be distinguished as follows:

BR_n_1: a beacon request type 1 is transmitted by STA_n when an interfering AP_m is received.

BR_n_2: beacon request type 2 is transmitted by STA_n when a DR_m is received in response to BR_n_1, to request synchronization of the BTWs with the received DR_m.

The delayed beacon request signal 68 is received by the APs which are within the FOV of the station STA_1. In this example, the APs which are within the FOV of STA_1 are AP_1 and AP_2.

On receiving the beacon request type 2, BR_1_2, AP_1 disregards the timing of the beacon request type 1, BR_1_1, in determining the time of its next beacon signal, and instead follows its usual periodic beacon timing. A beacon signal 70 is transmitted by AP_1 in its next beacon transmit window 71, which is after the beacon transmit window 63 that is used by AP_2 and AP_3. At this stage, AP_1 is not synchronized with AP_2 or AP_3.

The beacon signal 70 is received by the station which is within the FOV of AP_1, which is STA_1.

In response to beacon request signal 68 (BR_1_2), AP_1 transmits a beacon reset request 72 (shown as BRR_1) immediately preceding the next beacon transmit window 73 for AP_2 and AP_3, BTW_23. Beacon transmit window 73 takes place at its established timing, which is T_b after BTW 63 and the beacon request 68 (BR_1_2).

The beacon reset request 72 is transmitted by AP_1 in response to receiving both a beacon request type 1 (signal 60) and a beacon request type 2 (signal 68) from STA_1. The beacon reset request is transmitted for any station in the FOV of AP_1 to read. The beacon reset request is received by STA_1.

A purpose of the handshaking shown in FIG. 7 is to relay synchronization information from AP_2 to AP_1 via STA_1. The beacon reset request 72 tells STAs to adjust their window for when to look for beacon signals. The beacon reset request informs STAs within the FOV of AP_1 of new beacon of a new beacon transmit window timing.

The beacon reset request 72 asks all of the STAs that are within range of AP_1 to resynchronize their BTWs. In the present embodiment, only STA_1 is within range of AP_1.

By sending beacon reset request 72 to STA_1, STA_1 is informed of the time of beacon transmit window 73, BTW_23.

After sending the beacon reset request, AP_1 sets its BTW_1 to synchronize with BTW_23 after T_b resulting in beacon transmit window 79, which is used by all three APs and is therefore denoted BTW_123. By this means all relevant beacons are synchronized. BTW_23 keeps its timing and AP_2 asks the other APs (in this case, AP_1) to synchronize with BTW_23.

Signal 78 is a beacon signal transmitted by AP_2 during beacon transmit window 79. Signal 80 is a beacon signal transmitted by AP_1 during beacon transmit window 79. Signal 82 is a beacon signal transmitted by AP_3 during beacon transmit window 79.

STA_1 may determine whether the signal power of AP_1 or AP_2 is stronger based on the beacon signals transmitted during beacon transmit window 79, and associate with the AP having the stronger signal, for example by using an average RSSI as described above.

Using the additional handshaking signals described above, two APs that are already synchronized (AP_2 and AP_3) may be synchronized with a further AP (AP_1) that was initially unsynchronized with them, without loss of transmission. The synchronizing of the previous-unsynchronized APs may allow a good comparison of signal strength to determine whether a handover should occur.

Figure 8:
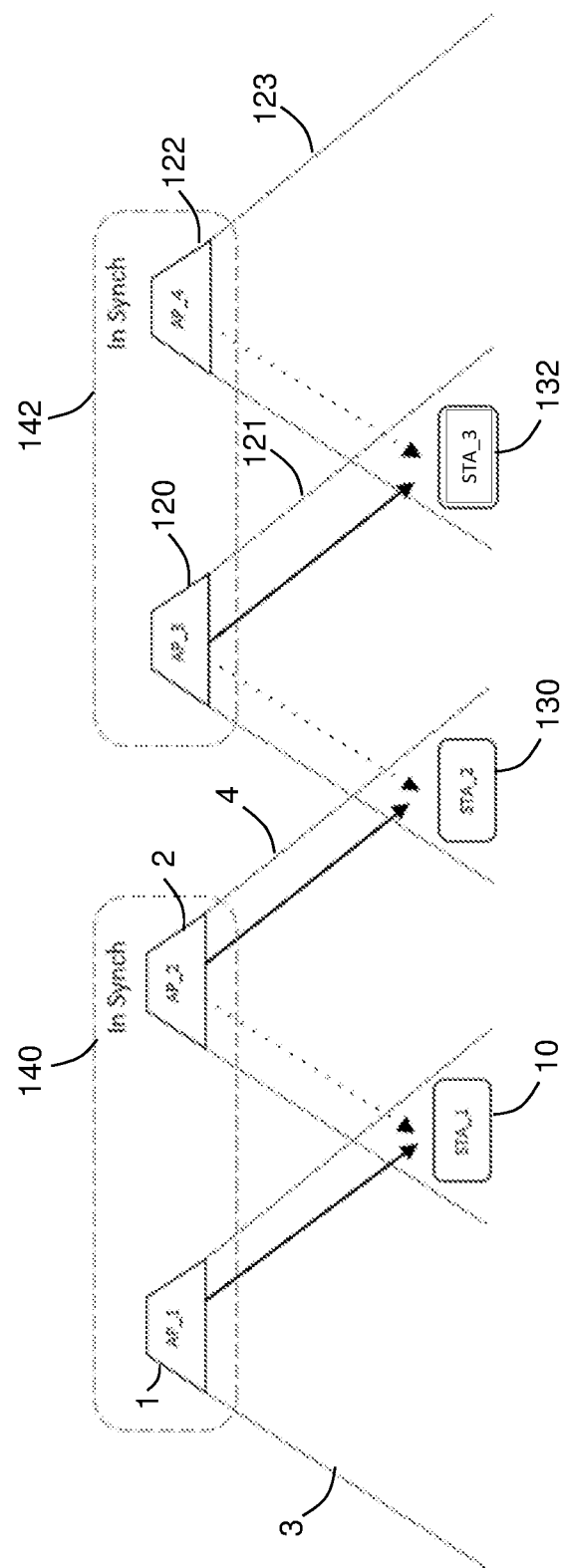
FIG. 8 is a schematic illustration of a wireless communication system comprising four access points and three stations.
Figure 9:
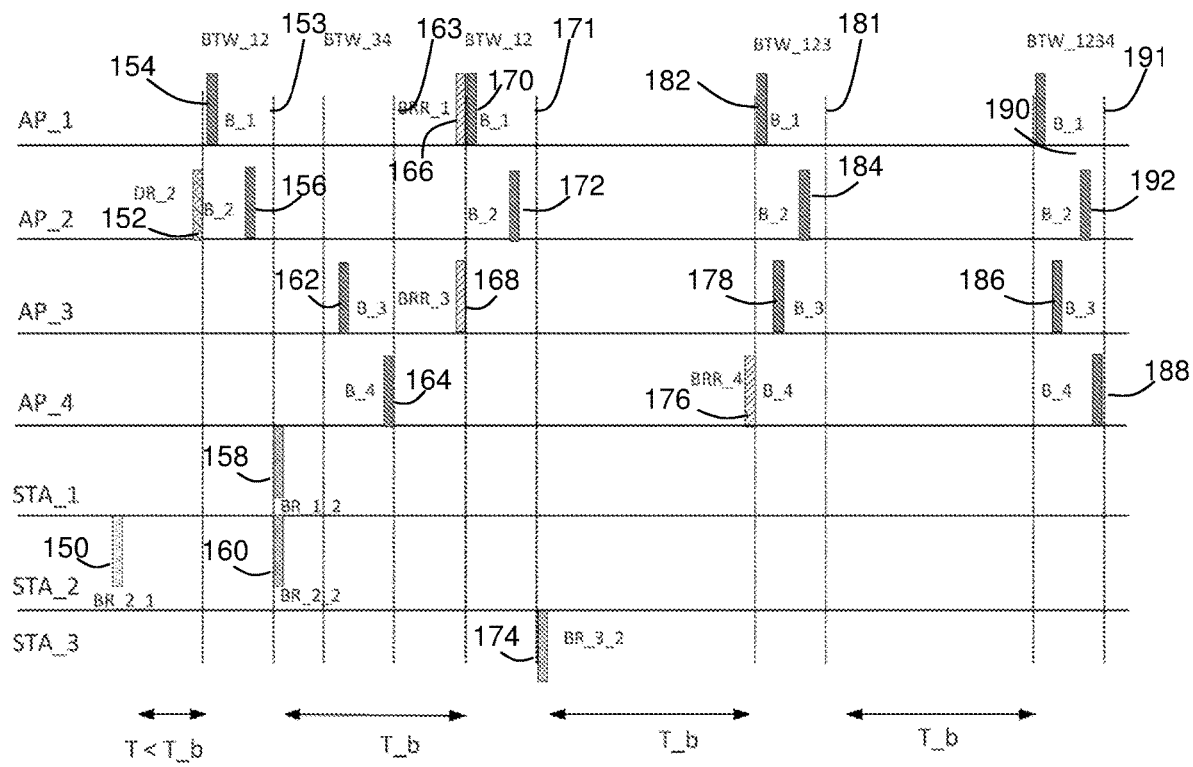
FIG. 9 is a schematic illustration of a signalling process in accordance with an embodiment.

FIG. 8 is a schematic illustration of a further arrangement of APs and STAs. FIG. 9 illustrates a case where there are many APs, some of which are already synched with a subset of APs. In the example of FIG. 8, there are two sets of APs that are already synchronized.

FIG. 8 shows a first AP 1 having a FOV 3, a second AP 2 having a FOV 4, and a station 10 which is positioned at a cell edge such that it is within the FOV 3, 4 of AP_1 and AP_2. FIG. 8 also shows a third AP 120 (AP_3) having a FOV 121 and a fourth AP 122 (AP_4) having a FOV 123. A second station 130 (STA_2) is positioned within the fields of view 4, 121 of AP_2 and AP_3. A third stations 132 (STA_3) is positioned within the fields of view 121, 123 of AP_3 and AP_4.

Initially, there are two sets of APs, {AP_1, AP_2} and {AP_3, AP_4}, each synchronized separately. A dotted line 140 in FIG. 9 is used to represent synchronization between AP_1 and AP_2. A dotted line 142 is used to represent synchronization between AP_3 and AP_4.

Initially, STA_2 is associated with AP_2. STA_2 moves to the coverage area 121 of AP_3, which is part of the second set of APs, {AP_3, AP_4}. AP_1 and AP_2 are already in synch and AP_3 and AP_4 are also independently in synch. STA_2 is located in the interference zone of AP_2 and AP_3.

An embodiment is now described in which AP_2 and AP_3 synch with each other while maintaining the synched relationship with AP_1 and AP_4 respectively. An AP that is already in synch requests its STAs to reset their beacon requests (and thus the beacon transmit window for all APs that receive the beacon requests from the STAs). Synchronization is spread out. All STAs hearing a beacon reset request send fresh beacon requests.

FIG. 9 is a schematic illustration of an optical wireless communication method in accordance with an embodiment.

The optical wireless communication method of FIG. 9 is performed by an optical wireless system as illustrated in FIG. 8.

The embodiment of FIG. 9 uses a similar handshaking method to that described above with reference to FIG. 7. If there are other STAs within an interference zone of an AP with other synchronized APs, this handshake synchronizes all of the APs.

In FIG. 9, signal 150 is a beacon request of type 1 (BR_2_1) that is sent by STA_2 upon entering the interference zone between AP_2 and AP_3, which is the overlap between fields of view 4 and 121 shown in FIG. 9.

Upon receiving signal 150, AP_2 sends back signal 152, which is a delay request (DR_2). Delay request 152 is sent immediately before the next beacon transmit window 153 of AP_1 and AP_2, which are synchronized. The example of FIG. 9 assumes that a BTW_12 occurs before a BTW_34.

In the beacon transmit window 153 (BTW_12), AP_1 transmits a beacon signal 154 and AP_2 transmits a beacon signal 156.

After beacon transmit window 153, STA_1 transmits signal 158 and STA_2 transmits signal 160. Each of signal 158 and signal 160 is a beacon request type 2 (BR_1_2, BR_2_2. Signals 158 and 160 are transmitted at the same time.

A beacon transmit window 163 (BTW_34) then takes place, in which AP_3 transmits a beacon signal 162 and AP_4 transmits a beacon signal 164.

On receiving signal 158 (BR_1_2), AP_1 transmits a beacon reset request 166 (BRR_1) to its associated STAs. The beacon reset request 166 is sent before the next beacon transmit window 171 for AP_1 and AP_2 (BTW_12), which occurs at a time T_b after the beacon requests 158, 160.

On receiving a beacon request type 2 BR_2_2 (signal 160), AP_3 sends a beacon reset request 168 (BRR_3) which occurs at a time T_b after the beacon request 160 (at the same time as the sending of beacon reset request 166). Beacon reset request 168 (BRR_3) is synchronized with the second beacon request 160 (BR_2_2) by STA_2. Beacon reset request 168 (BRR_3) is received by the stations within the coverage of AP_3.

On receiving beacon reset request 168 (BRR_3), STA_3 sends signal 174, which is a beacon request signal of type 2, BR_3_2. The timing of signal 174 is set in synch with signal 168 which was the beacon reset request from AP_3. Therefore, STA_3 requests all APs receiving its signal, i.e. AP_3 and AP_4, to become synchronized with the beacon transmit window of AP_1 and AP_2. STA_3 adjusts a window in which it looks for beacons.

The next beacon transmit window 181 occurs at a time T_b after the beacon request 174 (which itself occurred just after beacon transmit window 171).

Immediately before beacon transmit window 181, AP_4 transmits a beacon reset request 176 (BRR_4).

We note that AP_4 also transmits a beacon at time T_b after the beacon transmit window 163 (BTW_34), which is not shown in FIG. 9 for clarity.

Beacon transmit window 181 is common to AP_1, AP_2 and AP_3 and so is denoted as a BTW_123. During beacon transmit window 181, AP_3 transmits a beacon signal 178 (B_3), AP_1 transmits a beacon signal 182 (B_1) and AP_2 transmits a beacon signal 184 (B_2).

Finally, the beacon transmit window 191 is common to all APs and so is denoted as BTW_1234. This beacon transmit window takes place after a further interval of T_b. In beacon transmit window 191, AP_3 transmits a beacon signal 186

(B_3), AP_4 transmits a beacon signal 188 (B_4), AP_1 transmits a beacon signal 190 (B_1) and AP_2 transmits a beacon signal 192 (B_2).

STA_2 may determine which of AP_2 and AP_3 has the higher signal strength based on the beacon signals 192 and 186, and associate with one of AP_2 and AP_3 accordingly. The synchronization of AP_2 and AP_3 may be achieved without AP_2 losing synchronization to AP_1 and without AP_3 losing synchronization to AP_4.

Figure 10:
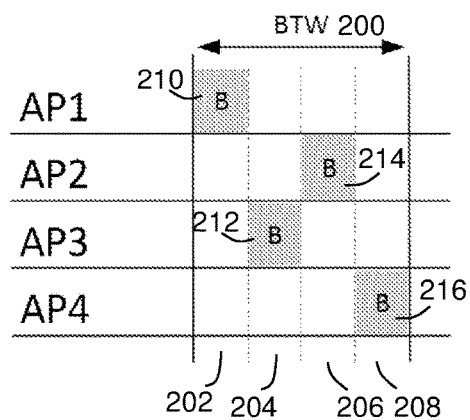
FIG. 10 is a schematic illustration of a beacon transmit window, showing beacon transmit slots within the beacon transmit window.

FIG. 10 is a schematic diagram showing a beacon transmit window 200. In the description above, it was mentioned that the beacon signals are transmitted within a beacon transmit window. However, for beacon signals to be received at a STA with no collision between beacon signals, the BTW is divided into a number of beacon transmission slots in which each AP can transmit its own beacon signal. In FIG. 10, the beacon transmission window 200 is divided into four beacon transmission slots 202, 204, 206, 208.

In the example of FIG. 10, the length of the beacon transmit window 200 is 1 ms. A length of each beacon frame is 230 μs. There are 4 slots 202, 204, 206, 208 within the beacon transmit window 200 during which an AP (for example, an interfering AP) can transmit its beacon signal.

An algorithm with which each AP may select a beacon transmission time slot is described below. By using an algorithm to select beacon transmission time slots, collisions between beacon signals arriving at a specific STA may be reduced or avoided.

The slots 202, 204, 206, 208 are labelled in order of time as Slot 0, Slot 1, Slot 2, Slot 3.

The AP selects which slot 202, 204, 206, 208 to transmit in using the following set of rules:
Slot 0 is used by the AP if the AP has sent a DR signal
Slot 1 is used by the AP if AP has sent a BRR after receiving a beacon request type 1
Slot 2 is used by the AP if the AP has sent a BRR without receiving a beacon request type 1
Slot 3 is used by the AP if no synchronization signalling has happened Using the algorithm may mean that interfering APs use different time slots for beacon transmission. Beacon collisions at a given STA may be mitigated.

In the example shown in FIG. 10, AP_1 transmits a beacon signal 210 in Slot 0. AP_3 transmits a beacon signal 212 in Slot 1. AP_2 transmits a beacon signal 214 in Slot 2. AP_4 transmits a beacon signal 216 in Slot 3.

Using methods described above, cell edge interference mitigation may be obtained without network/AP coordination. Improved SINR and network/link throughput may be achieved. Neighbouring APs may be synchronized without network/AP coordination.

Figure 11:
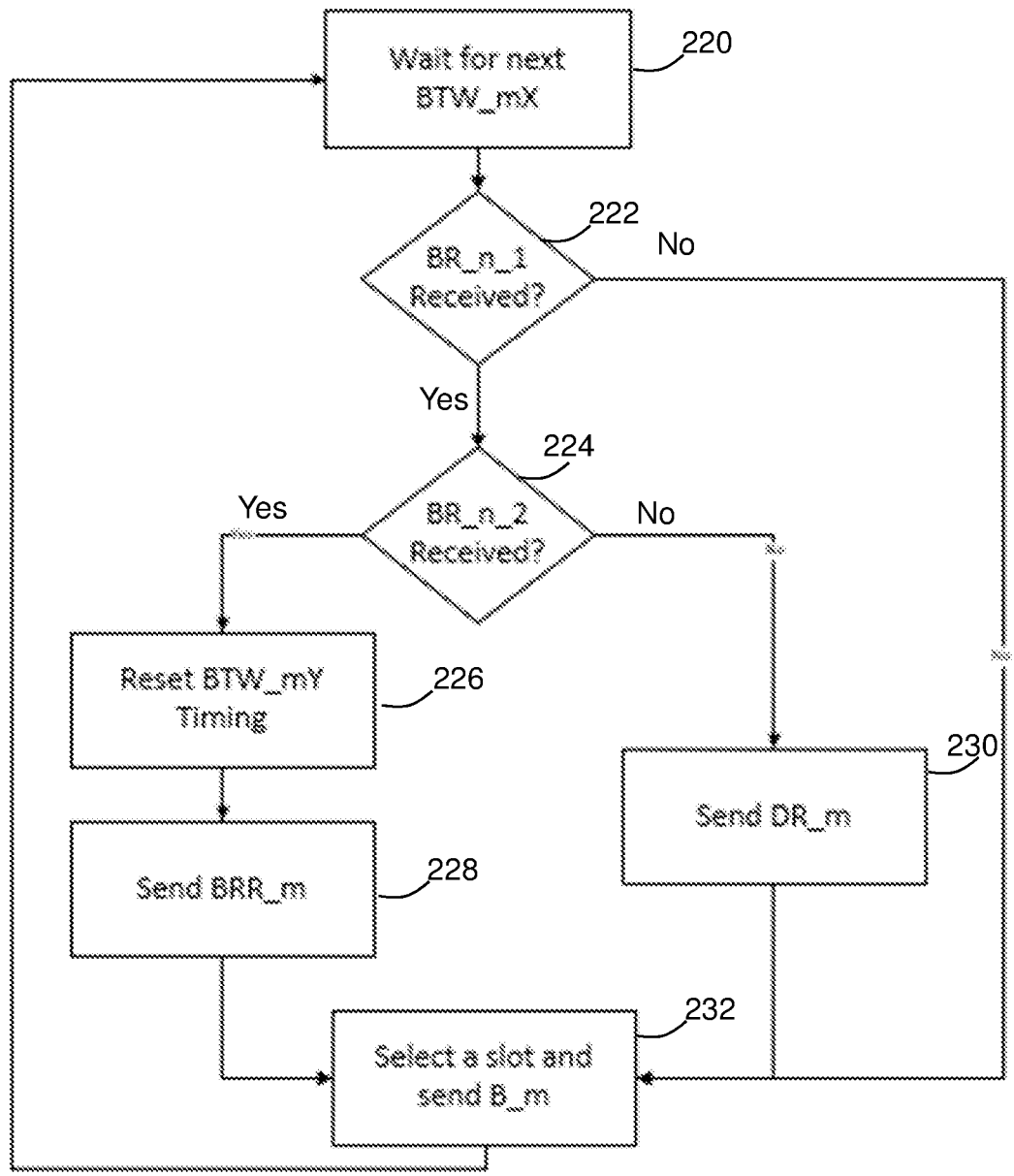
FIG. 11 is a flow chart illustrating in overview a beacon synchronization algorithm as viewed by an access point.

FIG. 11 is a flow chart illustrating in overview a decision process performed by an AP, which is designated AP_m.

At stage 220, AP_m waits for the next beacon transmit window BTW_mX, where X may be any one or more further APs. At stage 222, AP_m asks whether a beacon request type 1, BR_n_1, has been received. If the answer is no (NO branch of stage 222), the flow chart proceeds to stage 232. The AP_m selects a beacon transmit slot according to the set of rules described above, and transmits a beacon signal B_m.

If the answer to stage 222 is yes (YES branch of stage 222), the AP_m asks whether a beacon request type 2, BR_n_2, has been received. If no BR_n_2 has been received (NO branch of stage 224), the AP_m has received a beacon request type 1 without a beacon request type 2. The flow chart proceeds to stage 230, at which AP_m sends a delay request, DR_m. The flow chart then proceeds to stage 232 at which the AP_m selects a beacon transmit slot according to the set of rules described above, and transmits a beacon signal B_m.

If a BR_n_2 has been received at stage 224 (YES branch of stage 224), the flow chart proceeds to stage 226, at which the AP_m resets a timing for the next beacon transmit window BTW_mY. At stage 228, the AP_m sends a beacon reset request BRR_m. The flow chart then proceeds to stage 232 at which the AP_m selects a beacon transmit slot according to the set of rules described above, and transmits a beacon signal B_m.

After stage 232, the flow chart returns to stage 220 to wait for the next beacon transmit window.

At the end of the flow chart of FIG. 11, the AP may have been synchronized with at least one neighbouring AP due to receiving a beacon request. In this case, the AP continues to transmit beacon signals periodically, which continue to be synchronized with the at least one neighbouring AP.

In summary, when the AP receives a beacon request, the AP performs a synchronization procedure. In the simplest case, the synchronization procedure comprises transmitting a beacon signal. The beacon signal may be transmitted later than a next scheduled beacon signal, in response to the beacon request. In other embodiments, the synchronization procedure comprises sending a delay request, for example if the AP is already transmitting to another STA. The synchronization procedure may comprise sending a beacon reset request.

Figure 12:
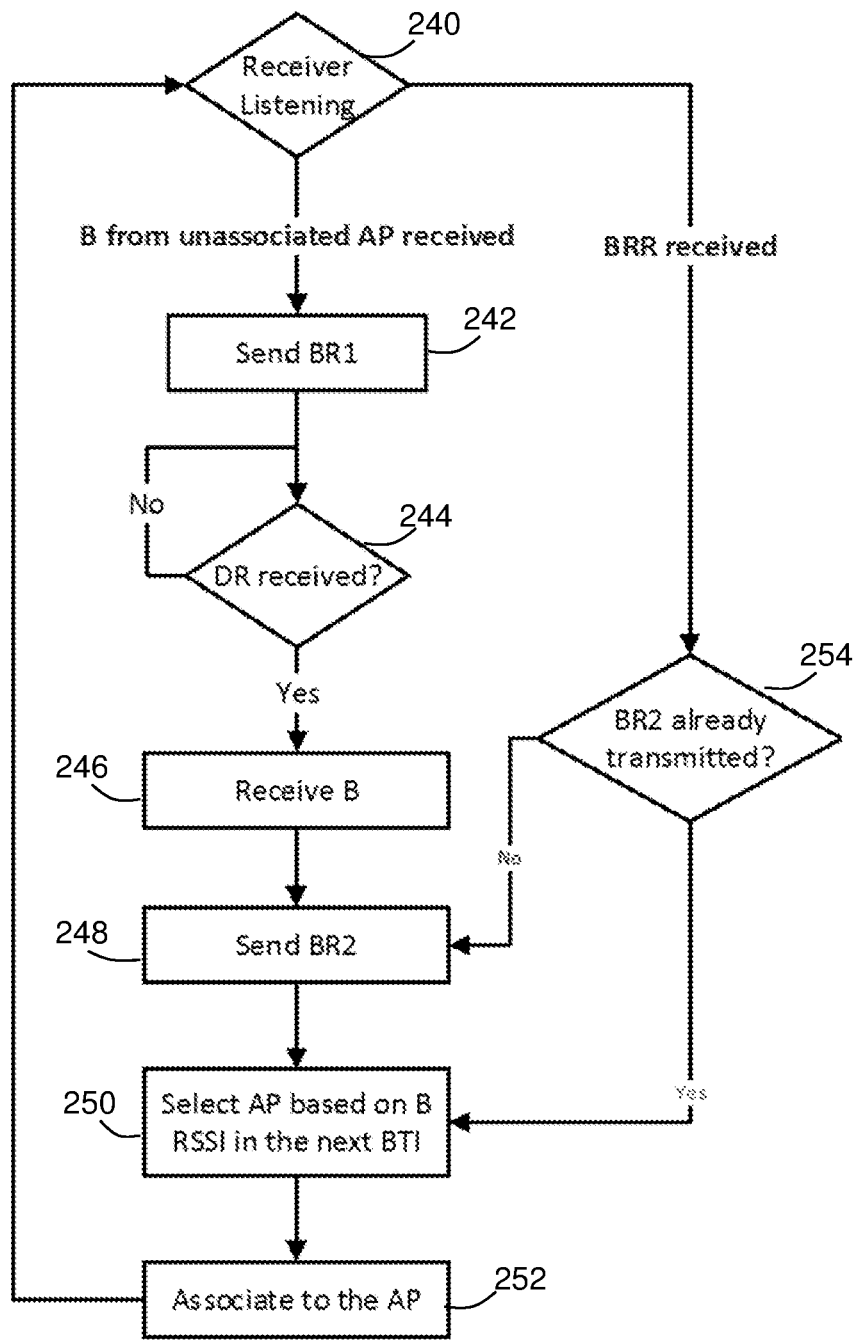
FIG. 12 is a flow chart illustrating in overview a beacon synchronization algorithm as viewed by a station.
Figure 13:
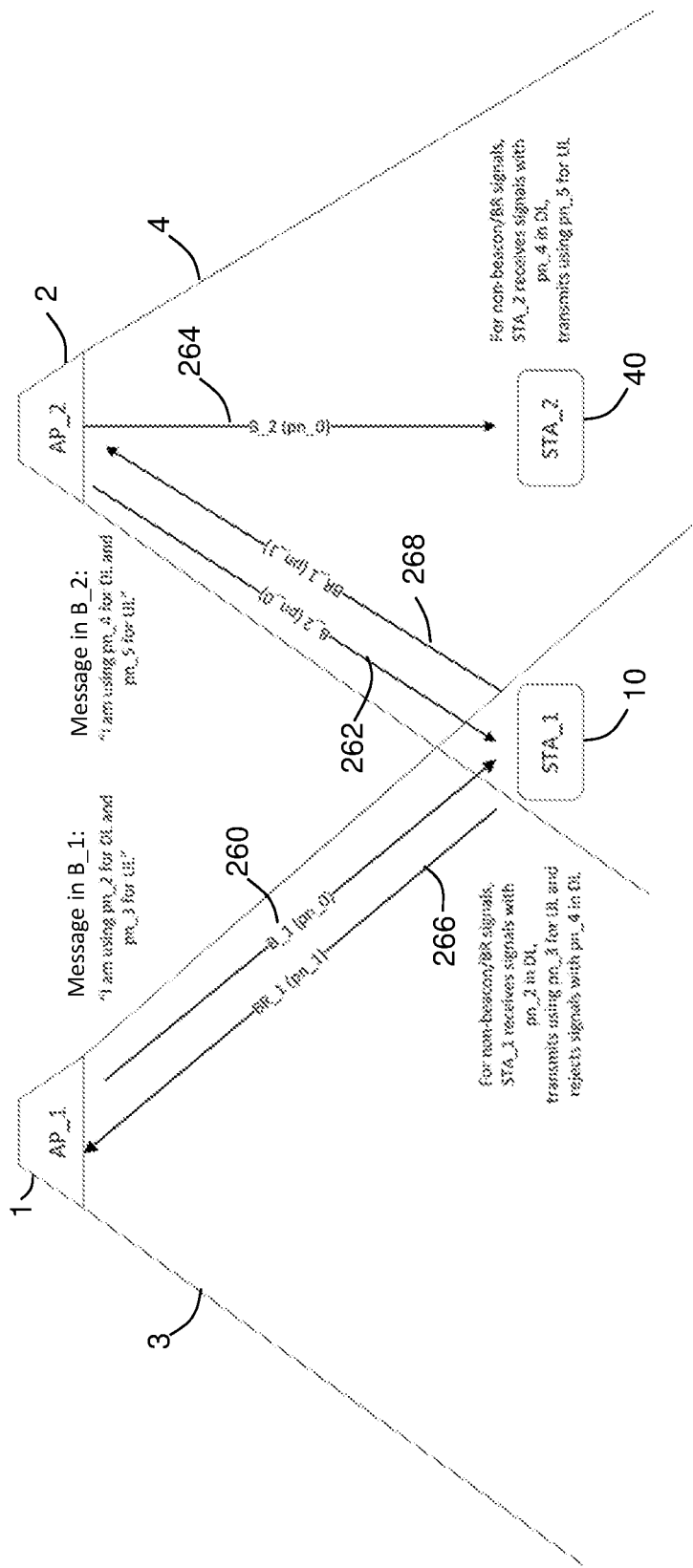
FIG. 13 is a schematic illustration of a wireless communication system comprising two access points and two stations, showing the transmission of various signals comprising pseudonoise identifiers.

FIG. 12 is a flow chart illustrating in overview a decision process performed by an STA, STA_n.

At stage 240, the STA is listening to receive a beacon, or a beacon reset request, from an AP. If a beacon signal (B_m) from an unassociated access point AP_m is received, then the STA goes to stage 242, and sends a beacon request type 1, BR_n_1. At stage 244, the STA waits to receive a delay request from the AP. Stage 244 is repeated until a delay request is received.

When the STA receives the delay request at stage 244, and then receives a beacon at stage 246, it proceeds to stage 248 where the STA sends a beacon request type 2, BR_n_2.

The flow chart then proceeds to stage 250. At stage 250, the station selects an access point to associate with, which in the example shown is AP_m. The STA selects AP_m based on the RSSI of the beacon signal B_m which is received in the next beacon transmit window, BTW_mX.

At stage 252, the STA associates to AP_m. The process of the flow chart returns to stage 240.

We now consider what happens if a beacon reset request is received at stage 240. The flow chart proceeds to stage 254, in which to the STA decides if a BR_n_2 was already sent or not. If the answer is no, it proceeds to stage 248 and sends a BR_n_2. If the answer is yes, it goes to stage 250 and selects an AP based on RSSI of beacons in the next beacon transmit window.

The invention claimed is:

1. A method for connecting a wireless communication station (STA) with a selected one of a plurality of access points (APs), wherein at least two of the APs are initially substantially unsynchronized in time, the method comprising:

transmitting, by the STA, a beacon request signal via an uplink channel;

performing, by the APs and in response to the beacon request signal, a synchronization procedure, the synchronization procedure comprising transmitting, by each of the APs, a respective beacon signal via at least one downlink channel, such that beacon signals from the plurality of APs are substantially synchronized in time;

receiving, by the STA, the beacon signals from the plurality of APs;

selecting, by the STA, one of the plurality of APs in dependence on at least one property of the beacon signals; and associating the STA with the selected one of plurality of APs.

2. A method according to claim 1, wherein the STA comprises an optical wireless communication (OWC) STA, the APs comprise OWC APs, and the uplink channel and the at least one downlink channel comprises optical channels.

3. A method according to claim 1,
wherein the at least one property of the beacon signals comprises a received signal strength, and
wherein the selecting of the one of the pluralities of APs is in dependence on a comparison of a respective received signal strength of each of the beacon signals.

4. A method according to claim 1,
wherein the STA is initially associated with one of the plurality of APs, and
wherein the transmitting of the beacon request signal by the STA is in response to identifying, by the STA, a signal from a different one of the plurality of APs.

5. A method according to claim 1, wherein the synchronization procedure further comprises setting, by each of the APs, a time for a beacon transmit window (BTW) in which the beacon signals are transmitted, thereby synchronizing the beacon signals transmitted by the APs.

6. A method according to claim 5,
wherein each of the APs is configured to transmit periodic beacon signals via the at least one downlink channel,
wherein each of the periodic beacon signals are transmitted within respective periodic beacon transmit windows, and
wherein the periodic beacon transmit windows are separated in time by a periodic inter beacon interval (Tb).

7. A method according to claim 6, further comprising, after the synchronization procedure, transmitting by the APs further periodic beacon signals such that the periodic beacon signals transmitted by all of the APs are substantially synchronized in time.

8. A method according to claim 6,
wherein the beacon signals are sent in response to the beacon request signal, and
wherein, for at least one of the APs, an interval (Tc) between the beacon signal sent in response to the beacon request signal and an immediately preceding beacon signal is different from the periodic inter beacon interval (Tb).

9. A method according to claim 1, the synchronization procedure further comprising:
transmitting, by a first one of the APs, a delay request in response to the beacon request signal; and
receiving, from the STA, a further beacon request signal in response to the delay request.

10. A method according to claim 9, where at least one of a) to c):
a) a time of transmission of the delay request is dependent on a scheduled beacon transmit window of the first one of the APs;
b) a time of transmission of the further beacon request signal is dependent on the time of transmission of the delay request; or c) the delay request is transmitted in response to the beacon request signal and in response to the first one of the APs being already synchronized with a second one of the APs.

11. A method according to claim 9, the synchronization procedure further comprising:
resetting, by a third one of the APs, a beacon transmit window in response to the beacon request signal and the further beacon request signal; and
transmitting, by the third one of the APs, a beacon reset request in response to the beacon request signal and the further beacon request signal, the beacon reset request communicating rescheduling of the beacon transmit window.

12. A method according to claim 6,
wherein the beacon transmit window comprises a plurality of beacon transmit slots, and
wherein each of the APs is configured to select a respective one of the beacon transmit slots for transmission of a beacon signal in dependence on at least one of a) to d):
a) whether the AP has transmitted a delay request;
b) whether the AP has transmitted a beacon reset request;
c) if the AP has transmitted a beacon reset request, whether the beacon reset request was in response to a beacon request; or
d) if the beacon reset request was in response to a beacon request, whether the beacon request was of a first type or a second type.

13. A method according to claim 1,
wherein each of the plurality of APs is allocated a respective at least one pseudonoise sequence for use in uplink and/or downlink communications,
wherein the beacon signal transmitted by each of the APs comprises an indication of the at least one pseudonoise sequence allocated to that AP, and
wherein the method further comprises identifying, by the STA, frames originating from an AP to which the STA is associated using the at least one pseudonoise sequence that was allocated.

14. A method according to claim 13, wherein each beacon signal comprises a common pseudonoise sequence that is used to identify signals as beacon signals.

15. A method according to claim 13, wherein the beacon request signal comprises a pseudonoise sequence that is used to identify signals as beacon request signals.

16. A method according to claim 13, wherein the STA is configured to reject based on allocated signals sent by any of the APs to which the STA is not associated based on the at least one pseudonoise sequence that was allocated.

17. A method according to claim 13, the method further comprising:
after the STA is connected to the selected one of the plurality of APs, receiving by the STA further frames from the selected one of the plurality of APs; and
identifying by the STA the further frames using the at least one pseudonoise sequence allocated to the selected one of the plurality of APs.

18. A method according to claim 1, wherein the transmitting of the beacon signals by the APs is synchronized at a local level without timing of the beacon signals being controlled by a network-level controller.

19. A method according to claim 1,
wherein each of the uplink channel and the at least one downlink channel comprises at least one of visible light, infrared light, optical light, and wherein the beacon request signals and beacon signals are transmitted using an OWC protocol.

20. An optical wireless communication system comprising:
    a station (STA) configured to transmit a beacon request signal via an uplink channel; and
    a plurality of access points (APs), wherein at least two of the APs are initially substantially unsynchronized in time, and wherein the plurality of APs is configured to perform, in response to the beacon request signal, a synchronization procedure, the synchronization procedure comprising transmitting by each of the plurality of APs a respective beacon signal via at least one downlink channel, such that the beacon signals from the plurality of APs are substantially synchronized in time,
    wherein the STA is further configured to receive the beacon signals from the plurality of APs, to select one of the plurality of APs in dependence on at least one property of the beacon signals, and to associate with the selected one of plurality of APs.

21. A station (STA) configured to perform operations comprising:
    transmitting a beacon request signal via an uplink channel;
    receiving from each of a plurality of access points (Aps) a respective beacon signal via at least one downlink channel, wherein the beacon signals from the plurality of APs are substantially synchronized in time;
    selecting one of the plurality of APs in dependence on at least one property of the beacon signals; and
    associating with the selected one of plurality of APs,
    wherein at least one of a) to c):
    a) the STA is initially associated with one of the plurality of APs, and wherein the STA is configured to transmit the beacon request signal in response to identifying, by the STA, a signal from a different one of the plurality of APs;
    b) the STA is further configured to transmit a further beacon request signal in response to receiving a delay request from one of the APs; or
    c) the STA is further configured, in response to receiving a beacon reset request from one of the APs, to adjust an interval in which the STA receives beacon signals.

22. An access point (AP) device of a plurality of AP devices, the AP device comprising a transmitter and a receiver,
    wherein the AP device is configured to perform a synchronization procedure with at least one of the plurality of AP devices in response to receiving a beacon request signal from a station (STA) on an uplink channel, and, if the AP device is already synchronized to at least one further AP device of the plurality of AP devices, is configured to transmit a delay request announcing timing of a beacon transmit window in response to the beacon request signal,
    wherein the synchronization procedure comprises:
        setting, by each of the plurality of AP devices, a time for the beacon transmit window in which the beacon signals are transmitted, thereby synchronizing in time the beacon signals transmitted by each of the plurality of AP devices and the further AP; and
        transmitting by each of the plurality of AP devices, a respective beacon signal via at least one downlink channel, such that the beacon signals from the plurality of AP devices are synchronized in time.

23. The AP device of claim 22,
    wherein the AP device is configured to receive a further beacon request signal from the STA on the uplink channel after transmission of the delay request and in response to receiving the further beacon request signal, to reset a beacon transmit window in which the beacon signals are to be transmitted and to transmit a beacon reset request,
    wherein the beacon reset request comprises rescheduling information related to the beacon transmit window.

* * * * *